UNITED STATES PATENT OFFICE.

C. PAUVERT, OF TARGÉ, FRANCE.

IMPROVEMENT IN COMPOUNDS FOR HARDENING IRON AND STEEL.

Specification forming part of Letters Patent No. 19,710, dated March 23, 1858.

*To all whom it may concern:*

Be it known that I, CHARLES PAUVERT, of Targé, in the French Empire, ecclesiastic and knight of the Legion of Honor, have invented a new and useful Process for Converting Iron into Steel; and I do hereby declare that the following is a full, clear, and exact description thereof.

The object of my invention consists in purifying the iron, in combining it chemically with the carbon by cementation, and in converting it into cast-steel of first quality, whatever be the nature of the iron used as the raw material.

I employ a cementing substance composed of the following ingredients and in the following proportions: thirty-three parts, by weight, of very finely powdered charcoal; thirty-three parts, by weight, of highly-aluminous clay; thirty-three parts, by weight, carbonate of lime or wood-ashes; one part, by weight, carbonate of soda; one part, by weight, carbonate of potash. These proportions are not vigorously required in all cases, and are liable to slight modifications, according to circumstances.

I operate in the following manner: The iron is stratified with the above-described cementing substance in an ordinary cementation oven or furnace, which is heated in the usual manner. By operating in this way and by using the above cementing substances I acquire a product which has all the qualities of the best steel of cementation bar and blistered steel, and which is known in France under the name of *acier d' Allemange*, or *acier de Rives*. This steel will not lose any of its qualities by being subjected to successive heats or by being drawn out. This is to be accounted for by the fact that the carbon is intimately united and combined in the steel. The reason is, the carbon, having but little affinity for the iron, requires, in order to combine intimately with it, first, that it should be in a nascent state; second, that this chemical combination should be assisted by the concurrence of multiplied electric currents. These two conditions are fulfilled in my new process, as the mutual reaction of the carbon and the carbonates frees the carbon when it assumes a molecular state. This change of the carbon and the carbonates, and the action of the red-hot iron upon the oxides of aluminium, calcium, potassium, and sodium, in presence of carbon when in a molecular state, absorb with avidity the sulphur, phosphorus, and other metalloids.

The steel thus prepared may be employed for the purposes to which the German or Rives steel is particularly well adapted—that is, for the conversion into cast-steel. To convert this steel into cast-steel, the ordinary processes of melting in the crucible are resorted to, with the exception, however, that from five to six per cent., in weight, of the following mixture is added to the metal, viz: four parts, by weight, dry carbonate of soda; four parts, by weight, dry carbonate of potash; three parts, by weight, wood-ashes; two parts, by weight, borax; three parts, by weight, oxide of manganese; from four to seven parts, by weight, charcoal, or hydrocarbons, or soot, or animal black. The four parts of carbonate of potash may be substituted by two parts of caustic potash. The mixture of these substances is to be made with utmost care, as the nature of the product will vary with the number and proportions of the ingredients used. The multiplied reactions of these substances produce the following results: first, creation of electric currents; secondly, complete reduction of the manganese, which unites with the steel; thirdly, reduction of earthy and alkaline metals and of the boron, whereby the metalloids are absorbed; fourthly, destruction of nitrous gases, because the reduced potassium, sodium, and calcium, in presence of steel and of the carbon in its nascent state, absorb the azote to form cyanides of potassium, sodium, and calcium; fifthly, formation of crystals in the steel during its congelation, which are larger than those produced by any other process.

Having now fully described my invention, what I claim, and desire to secure by Letters Patent, is—

The use of the ingredients herein described, compounded in the manner specified, for converting iron into steel.

In testimony whereof I have signed my name to this specification before two subscribing witnesses.

C. PAUVERT.

Witnesses:
   C. J. ZARCHIER,
   GEO. HUTTON.